(12) United States Patent
Lipton et al.

(10) Patent No.: US 7,646,401 B2
(45) Date of Patent: Jan. 12, 2010

(54) VIDEO-BASED PASSBACK EVENT DETECTION

(75) Inventors: Alan J. Lipton, Herndon, VA (US);
Péter L. Venetianer, McLean, VA (US);
Andrew J. Chosak, Arlington, VA (US);
Matthew F. Frazier, Arlington, VA (US); Donald G. Madden, Falls Church, VA (US); Gary W. Myers, Ashburn, VA (US); James S. Sfekas, Arlington, VA (US); Weihong Yin, Herndon, VA (US)

(73) Assignee: ObjectVideo, Inc, Reston, VA (US)

( * ) Notice: Subject to any disclaimer, the term of this patent is extended or adjusted under 35 U.S.C. 154(b) by 1077 days.

(21) Appl. No.: 10/766,949

(22) Filed: Jan. 30, 2004

(65) Prior Publication Data

US 2005/0168574 A1 Aug. 4, 2005

(51) Int. Cl.
*H04N 7/18* (2006.01)
*G06K 7/00* (2006.01)
(52) U.S. Cl. .................. 348/143; 382/107; 348/152
(58) Field of Classification Search .......... 348/143, 348/152, 150, 159; 345/850; 701/117; 340/573, 340/541; 382/107
See application file for complete search history.

(56) References Cited

U.S. PATENT DOCUMENTS

| | | | |
|---|---|---|---|
| 5,097,328 A * | 3/1992 | Boyette ................. 348/150 |
| 6,215,519 B1 * | 4/2001 | Nayar et al. ............. 348/159 |
| 6,628,805 B1 * | 9/2003 | Hansen et al. ........... 382/107 |
| 6,696,945 B1 * | 2/2004 | Venetianer et al. ....... 340/541 |
| 7,148,912 B2 * | 12/2006 | Han et al. ............... 348/143 |
| 2003/0058111 A1 * | 3/2003 | Lee et al. ............... 340/573.1 |
| 2003/0063133 A1 * | 4/2003 | Foote et al. ............. 345/850 |
| 2004/0085449 A1 * | 5/2004 | Millet et al. ............ 348/152 |
| 2005/0033505 A1 * | 2/2005 | Zatz .................... 701/117 |

\* cited by examiner

*Primary Examiner*—Gims S Philippe
(74) *Attorney, Agent, or Firm*—Venable LLP; Michael A. Sartori; Marina V. Zalevsky

(57) ABSTRACT

A passback direction for a video monitored area may be defined. Video collected from the video monitored area may be accessed. Video collected from a video monitored area may be analyzed based on a passback direction of the video monitored area to detect any passback events in the video monitored area. An action based on the detected passback events may be initiated.

4 Claims, 11 Drawing Sheets

VIDEO-BASED PASSBACK EVENT DETECTION

FIELD OF THE INVENTION

The present invention is directed to the general field of video processing. In particular, the invention is concerned with the detection of motion in a specified direction.

BACKGROUND OF THE INVENTION

In several situations, a certain area is reserved for one-way traffic only. For example, at an entrance to a sporting event or an entrance of a secure area. A person not following the one-way traffic can avoid paying the entry fees, or more dangerously, can compromise security at, for example, an airport. Preventing such activity is of great importance.

Traditionally, two approaches are used to prevent a person from moving in such a wrong direction: a physical barrier or a security guard. A physical barrier is typically some sort of a turnstile (e.g., at a sporting event, or at a subway station), or a tire shredding spike strip at a parking lot. The problem with these solutions is that they considerably slow down the traffic flow and have problems accommodating special needs, like wheelchairs or suitcases. For these reasons some locations, like airports, typically use the second approach and employ one or more security guards to watch for and prevent people proceeding in the wrong direction (e.g., at an exit corridor). The problem with this second approach is that a security guard can become distracted or bored, allowing a person to proceed in the wrong direction.

Video surveillance systems are in common use today. Traditional video surveillance systems generally involve the use of one or more video cameras, and the video output from the camera(s) is either recorded for later review or monitored by a human observer, or both. Some video surveillance systems use computer-based video processing techniques to detect various events, providing unobtrusive, 24/7 vigilance (i.e., 24 hours a day, 7 days a week). Examples of such systems are discussed in the following, for example, which are incorporated herein by reference: U.S. patent application Ser. No. 09/987,707, filed Nov. 15, 2001, titled "Video Surveillance System Employing Video Primitives"; U.S. patent application Ser. No. 09/972,039, filed Oct. 9, 2001, titled "Video Tripwire"; Third Generation Surveillance Systems, Proceedings of the IEEE, October 20001.

SUMMARY OF THE INVENTION

One embodiment of the invention includes a computer-readable medium comprising software, which when executed by a computer system, cause the computer system to perform operations comprising a method of: defining a passback direction for a video monitored area; accessing video collected from the video monitored area; analyzing the video collected from the video monitored area to detect passback events in the video monitored area based on the passback direction; and initiating an action based on any detected passback events.

One embodiment of the invention includes a method, comprising: defining a passback direction for a video monitored area; accessing video collected from the video monitored area; analyzing the video collected from the video monitored area to detect passback events in the video monitored area based on the passback direction; and initiating an action based on any detected passback events.

One embodiment of the invention includes a system, comprising: at least one video camera to monitor at least one video monitored area and to obtain video of the video monitored area; an analysis system coupled to the video camera, the analysis system comprising a computer system and a computer-readable medium, the computer-readable medium comprising software to control the computer system according to a method, the method comprising analyzing the obtained video to detect passback events in the video monitored area based on a passback direction for the video monitored area; and a user interface coupled to the analysis system.

BRIEF DESCRIPTION OF THE DRAWINGS

The foregoing and other features and advantages of the invention will be apparent from the following, more particular description of the embodiments of the invention, as illustrated in the accompanying drawings.

DETAILED DESCRIPTION OF THE EMBODIMENTS

Figure 1:
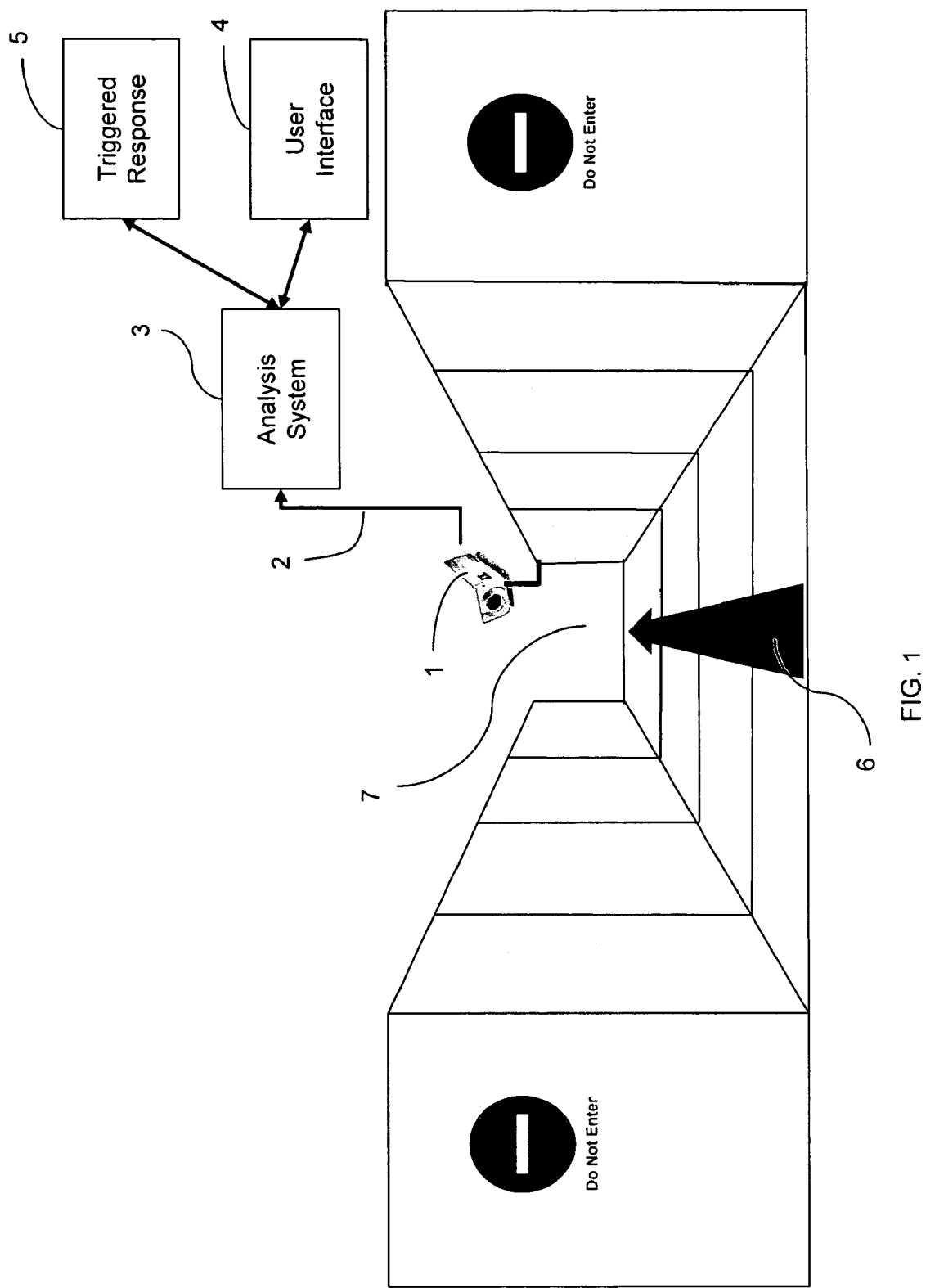
FIG. 1 illustrates a video based passback event detection system according to an exemplary embodiment of the invention.

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

In general, the invention may be used to detect a passback event in a video monitored area. The invention may be used to determine and track a direction of a target through a video monitored area and compare the direction of the target to one or more passback directions of the video monitored area to determine any passback events of the target. A passback event may refer to one or more instances of a target having one or more directions generally corresponding to a passback direction of a video monitored area. A passback direction of a video monitored area may refer to one or more designated general directions generally through a video monitored area.

A target may refer to one or more persons and/or one or more objects. A video monitored area may refer to an area that is at least monitored by video. Examples of a video monitored area may include: a corridor; a hallway; a passageway; a tunnel; an entrance and/or exit for a public or paid event (e.g., sport, music, or political); a parking lot; an escalator; an elevator; a people mover; a subway entrance and/or exit; an entrance or exit of a secure area at an airport, train station, customs area, or passenger terminal; an area before and/or after a security check point; an entrance and/or exit of a sterile area (e.g., a secure area, or a clean room); a restroom; a waterway; an area desirably having one-way traffic; an area having unrestricted traffic flow; and an area monitored by video.

The present invention may implement automated passback event detection using computer-based video processing techniques. In contrast to the traditional approaches, the inventive video surveillance system may provide 24/7 vigilance without requiring traffic flow limiting physical barriers and/or constant monitoring by a person, although such barriers and monitoring may provide additional layers of surveillance and/or security. In addition to detecting a passback event and initiating an alert when it happens, the inventive system may also automatically record snapshots and/or video of the passback event. The invention may also operate in real time.

FIG. 1 illustrates a video-based passback event detection system according to an exemplary embodiment of the invention. The invention may include a video camera 1, a communication medium 2, an analysis system 3, a user interface 4, and a triggered response 5. The invention may be used to monitor a passback direction 6 of a video monitored area 7.

The video camera 1 may be trained on the video monitored area 7 and may generate output signals. Examples of the video camera 1 may include one or more of the following: a video camera; a digital video camera; a color camera; a monochrome camera; a camera; a camcorder; a PC camera; a webcam; an infra-red video camera; a CCTV camera; a pan, tilt, zoom (PTZ) camera; and a video sensing device. In an exemplary embodiment, the video camera 1 may be positioned such that a target moving in the passback direction 6 moves towards the video camera 1, and the face of the target may be captured while simultaneously detecting the passback event, thus providing useful information for forensic analysis of the detected passback event.

In one exemplary embodiment, the video camera 1 may be equipped to be remotely moved, adjusted, and/or controlled. With such video cameras, the communication medium 2 between the video camera 1 and the analysis system 3 may be bi-directional (not shown), and the analysis system 3 may direct the movement, adjustment, and/or control of the video camera 1.

In one exemplary embodiment, the video camera 1 may include multiple video cameras monitoring the same video monitored area.

In one exemplary embodiment, the video camera 1 may include multiple video cameras monitoring multiple video monitored areas.

The communication medium 2 may transmit the output of the video camera 1 to the analysis 3. The communication medium 2 may be, for example: a cable; a wireless connection; a network (e.g., a number of computer systems and associated devices connected by communication facilities; permanent connections (e.g., one or more cables); temporary connections (e.g., those made through telephone, wireless, or other communication links); an internet, such as the Internet; an intranet; a local area network (LAN); a wide area network (WAN); a combination of networks, such as an internet and an intranet); a direct connection; an indirect connection). If communication over the communication medium 2 requires modulation, coding, compression, or other communication-related signal processing, the ability to perform such signal processing may be provided as part of the video camera 1 and/or separately coupled to the video camera 1 (not shown).

The analysis system 3 may receive the output signals from the video camera 1 via the communication medium 2. Analysis system 3 may perform analysis tasks, including necessary processing, to implement the detection of passback events in the video monitored area 7. The analysis system 3 is discussed further below with respect to FIG. 2.

The user interface 4 may provide input to and may receive output from the analysis system 3. The user interface 4 may include, for example, one or more of the following: a monitor; a mouse; a keyboard; a touch screen; a printer; speakers and/or one or more other input and/or output devices. Using user interface 4, a user may provide inputs to the analysis system 3, including those needed to initialize the analysis system 3 (e.g., defining the video monitored area 7 and the passback direction 6), provide input to analysis system 3, and receive output from the analysis system 3.

The triggered response 5 may include one or more responses triggered by one or more detected passback events. Examples of the triggered response 5 include: initiating an alarm (e.g., audio, visual, and/or mechanical); controlling an audible alarm system (e.g., to notify the target, security personnel and/or law enforcement personnel); controlling a silent alarm system (e.g., to notify security personnel and/or law enforcement personnel); accessing an alerting device or system (e.g., pager, telephone, e-mail, and/or a personal digital assistant (PDA)); sending an alert (e.g., containing imagery of the violator, time, location, etc.) to a guard or other interested party; logging alert data to a database; taking a snapshot of the passback event using the video camera 1 or another camera; culling a snapshot from the video obtained by the video camera 1; recording video with a video recording device (e.g., an analog or digital video recorder) of the passback event; controlling a PTZ camera to zoom in to the target; controlling a PTZ camera to automatically track the target; performing recognition of the target using, for example, biometric technologies or manual inspection; closing one or more doors to physically prevent a target from reaching an intended target and/or preventing the target from escaping; controlling an access control system to automatically lock, unlock, open, and/or close portals in response to the passback event; or other responses to a detected passback event.

Figure 2:
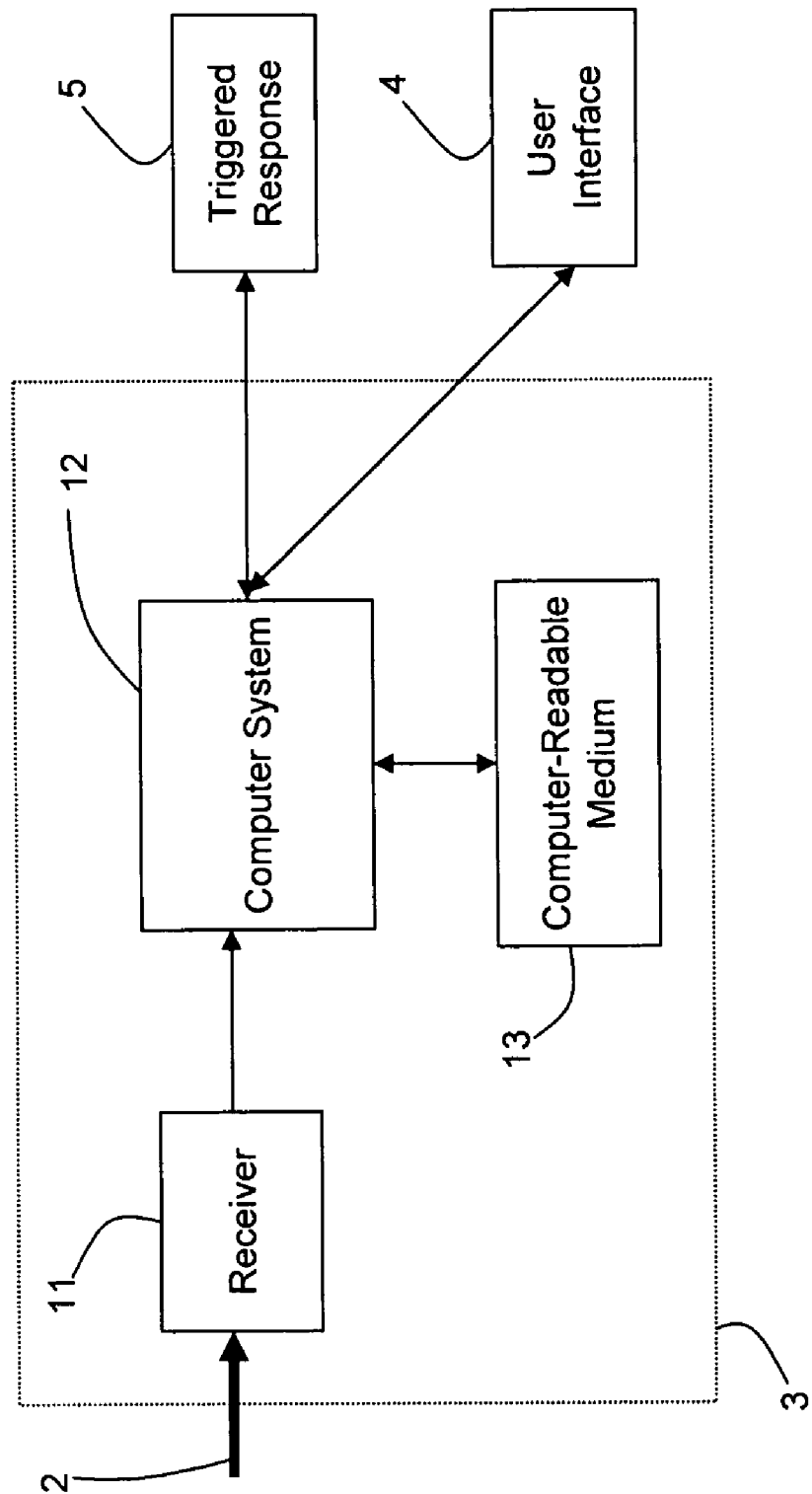
FIG. 2 illustrates a block diagram of an exemplary embodiment of an analysis system.

FIG. 2 illustrates a block diagram of an embodiment of the analysis system 3 according to an exemplary embodiment of the invention. The analysis system 3 may be coupled to the communication medium 2, the user interface 4, and the triggered response 5, as also shown in FIG. 1. In an exemplary embodiment of the invention, the analysis system 3 may include a receiver 11, a computer system 12, and a computer-readable medium 13.

The receiver 11 may receive the output signals of the video camera 1 from the communication medium 2. If the output signals of the video camera 1 have been modulated, coded, compressed, or otherwise communication-related signal processed, the receiver 11 may be able to perform demodulation, decoding, decompression or other communication-related signal processing to obtain the output signals from the video camera 1, or variations thereof due to any signal processing. Furthermore, if the signals received from the communication medium 2 are in analog form, the receiver 11 may be able to convert the analog signals into digital signals suitable for processing by the computer system 12. The receiver 11 may be implemented as a separate block (shown) and/or integrated into the computer system 12. Also, if it is unnecessary to perform any signal processing prior to sending the signals via the communication medium 2 to the computer system 12, the receiver 11 may be omitted.

The computer system 12 may be coupled to the receiver 11, the computer-readable medium 13, the user interface 4, and the triggered response 5. In general, the computer system 12 may refer to one or more apparatus and/or one or more systems that are capable of accepting a structured input, processing the structured input according to prescribed rules, and producing results of the processing as output. Examples of the computer system 12 may include: a computer; a stationary and/or portable computer; a computer having a single processor or multiple processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software; a distributed computer system for processing information via computer systems linked by a network; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

The computer-readable medium 13 may include all necessary memory resources required by the computer system 12 for the invention and may also include one or more recording devices for storing signals received from the communication medium 2 and/or other sources. In general, the computer-readable medium 13 may refer to any storage device used for storing data accessible by the computer system 12. Examples of the computer-readable medium 13 may include: a magnetic hard disk; a floppy disk; an optical disk, such as a CD-ROM and a DVD; a magnetic tape; and a memory chip. The computer-readable medium 13 may be external to the computer system 12 (shown) and/or internal to the computer system 12.

Figure 3:
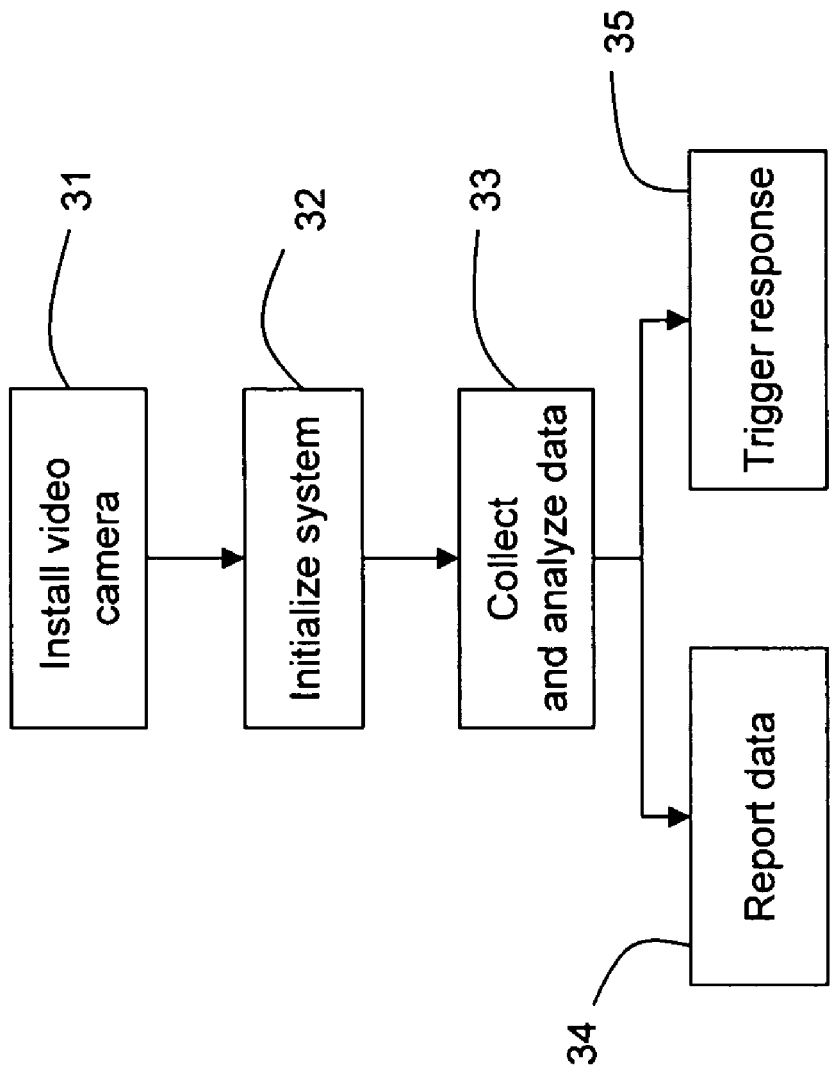
FIG. 3 illustrates a flowchart depicting a method according to an exemplary embodiment of the invention.

FIG. 3 illustrates a flowchart depicting a method according to an exemplary embodiment of the invention. In an exemplary embodiment, the method may be implemented with software running on the computer system 12 and stored on the computer-readable medium 13. In general, software refers to prescribed rules to operate the computer system 12. Examples of software include: software; code segments; instructions; software programs; computer programs; and programmed logic.

In block 31, a video camera 1 may be installed. In one exemplary embodiment, the video camera 1 is installed so as to be stationary and, to the extent possible, is installed with "natural" orientation (i.e., "up" in the images corresponds to "up" in the real world). With natural orientation, the field of view of video camera 1 may contain a large enough portion of the video monitored area 7 such that a target generally moving in the passback direction 6 may be in the video monitored area 7 for a generally sufficient amount of time for the analysis system 3 to obtain the direction of motion of the target. Block 31 is optional if a video camera 1 is already installed and if there is no need for a new installation or adjustment.

In block 32, the analysis system 3 may be initialized via the user interface 4. A user may enter various parameters relating to how the analysis system 3 responds to data. For example, a user may designate parameters related to: collecting and analyzing data (e.g., a passback direction 6, an area of interest, a time interval of detection, a sensitivity of detection); logging data (e.g., logging a detected passback event, such as those discussed below with respect to block 33, and logging a non-detection); reporting data (e.g., reporting a detected passback event, such as those discussed below with respect to block 34); and responding to data (e.g., a triggered response 5).

Regarding parameters for collecting and analyzing data, the user may select various attributes of the passback event detection scheme. For example, the user may select the passback direction 6. As another example, the user may select a region of interest in the image from the video camera 1 of the video monitored region 7 to be monitored. The region of interest may be, for example: a portion of the field of view of the video camera 1; the entire field of view of the video camera 1; a continuous region; a discontinuous region; and a region except an ignored region (e.g., to avoid false alarms). In an exemplary embodiment to select the passback direction 6 and a region of interest, the user may identify these on a video stream or an image from the video stream from the video camera 1 using a point-and-click interface in a graphical user interface. For example, the graphical user interface may be adapted to permit a user to draw the passback direction on an image of said video monitored area and/or video of said video monitored area.

Figure 10B:
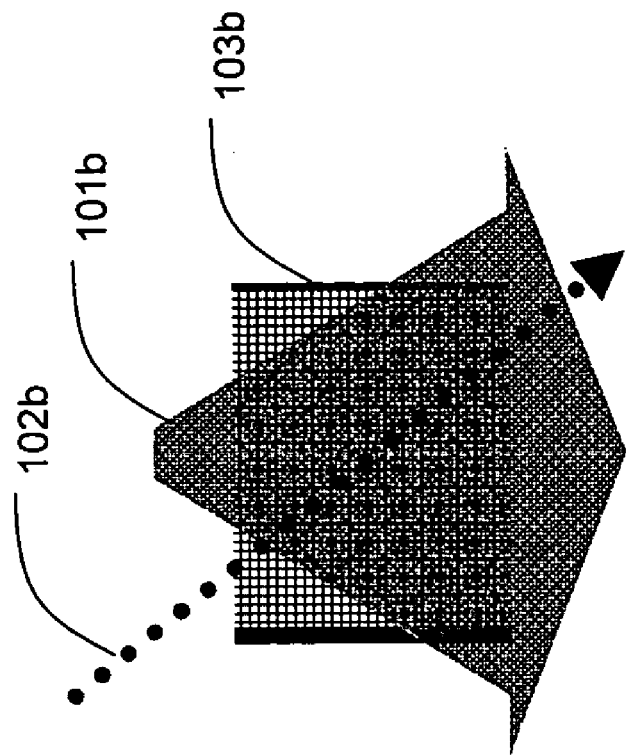
FIGS. 10A and 10B illustrate an example of specifying a range for a passback direction for passback event detection.
Figure 10A:
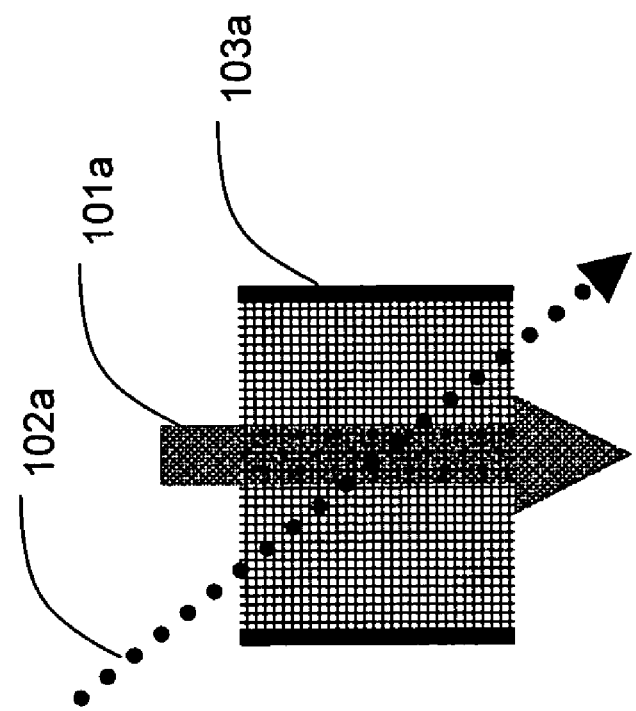

FIGS. 10A and 10B illustrate an example of specifying a passback direction 6 and an area of interest for passback event detection. In FIG. 10A, a narrow range for the passback direction and area of interest (designated together generally as 101*a*) may allow a target 102*a* to cross the video monitored area 103*a* unnoticed. In contrast, in FIG. 10B, a wide range for the passback direction 102*b* and area of interest (designated together generally as 101*b*) may successfully detect the same target 102*b* crossing the video monitored area 103*b*. Hence, in this example, a wide range for the passback direction may provide better detection of certain passback events.

In an exemplary embodiment, a user may use a graphical user interface to specify a passback direction 6, a region of interest, and a time interval of detection. As an alternative, the analysis system 3 may learn the passback direction 6. The analysis system 3 may automatically learn a normal direction of motion in the video monitored area by observing the video monitored area (or the user-designated region of interest) for an observation period and determining the passback direction based on the normal direction. For example, the direction(s) in which most of the motion occurs during the observation period may be designated as the normal direction, while other direction(s) (e.g., never or rarely occurring directions) may be determined to be the passback direction. As another alternative, the passback direction may be learned as a function of time, and two or more passback directions may be learned. The analysis system 3 may detect that in certain time periods a certain direction of motion dominates and is designated as the normal direction, while at other times another direction dominates and is designated as the normal direction. For example, an initial passback direction may be learned for an initial time period, and at least one additional passback direction may be learned for at least one additional time period. As a further example, a first passback direction may be learned for a first time period, a second passback direction may be learned for a second time period, and a third passback direction may be learned for a third time period. The analysis system 3 may then automatically change the passback direction based on the time of day, the day of the week, and/or relative time (e.g., beginning of a sporting event, and ending of sporting event). The learned passback directions and times may be displayed for the user, who may verify and/or modify them.

In block 33, the analysis system 3 may operate to collect and analyze data based on the parameters selected by the user in block 32. The data may be from video from the video camera 1. The data may be in real time or delayed. As an option, the data may be from video stored on the computer-readable medium 13 or elsewhere (e.g., a removable memory device, a video tape, or accessible via a network). If the user selected a time interval of detection, the analysis system 3 may start processing when the time is within the time interval.

When the analysis system 3 detects a passback event in block 33, the analysis system may log the detected passback event. For example, the information logged for the detected passback event may include: time and date; camera identifier; camera position; identification of the target; identification of travel direction of the target; one or more snapshots of the target; and one or more video records of the target. An exemplary embodiment of the analysis system 3 is discussed below with respect to FIG. 4.

In block 34, when the data has been collected and analyzed in block 33, the data may be reported to the user. In one exemplary embodiment, detailed data on one or more individual detected passback events and/or summary information may be reported to the user. Examples of data on an individual detected passback event may include: time; date; direction; location; size of crossing area of target; indication of amount of occlusion and/or partial occlusion of target; and one or more snapshots of the detected passback event; and one or more videos captured around the time of the detection of the passback event. Examples of summary information may include: number of detections, with or without a user-selected time window; and time histograms of detections. In an exemplary embodiment, a user may query the analysis system 3 for results using a graphical user interface (GUI) provided by the user interface 4, and the analysis system 3 may report data to the user using a GUI provided by the user interface 4. In an exemplary embodiment, a user may select in block 32 what type and how data is reported.

In block 35, a detected passback event may trigger a response 5. In an exemplary embodiment, a user may select in block 32 the triggered response 5.

Blocks 34 and 35 may be optional. Block 34 and/or block 35 may be optional at the discretion of a user.

Figure 4:
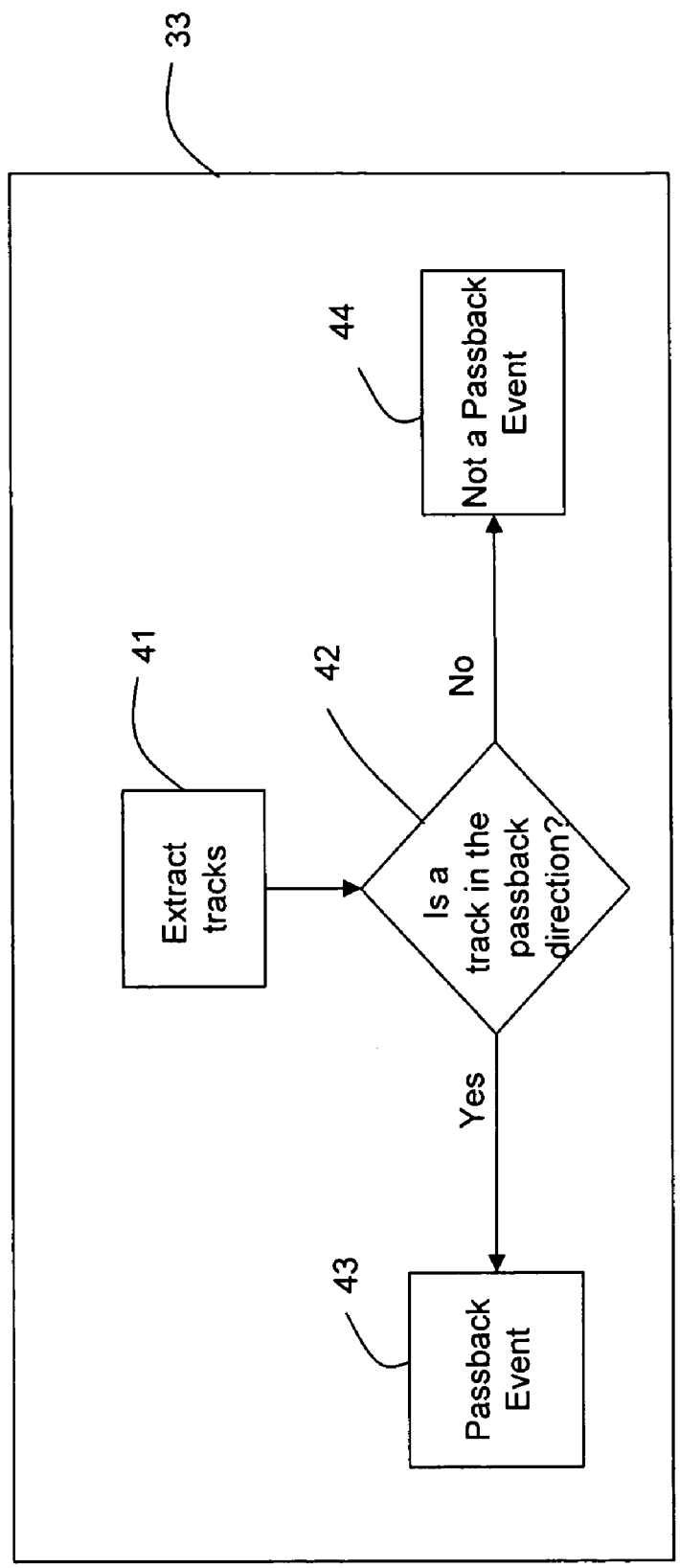
FIG. 4 illustrates a flowchart depicting an exemplary embodiment of detecting a passback event.

FIG. 4 illustrates a flowchart depicting an exemplary embodiment of detecting a passback event for collecting and analyzing data in block 33.

In block 41, tracks may be extracted from the video. As part of the extracting the tracks, the direction in which a possible target is moving in the video may be determined. Due to the nature of the problem, no matter how the video camera 1 is mounted, the possible target in the view may often be partially occluded (e.g., by people moving not moving in the disallowed direction). Occlusion and partial occlusion may make tracking a possible target very difficult. Hence, in an exemplary embodiment, only visible features of the possible target may be tracked. Exemplary embodiments of block 41 are discussed below with respect to FIGS. 5 and 8.

In block 42, once the tracks are extracted from the video in block 41, each track may be compared to the passback direction 6. In an exemplary embodiment of this comparison, each track and the passback direction 6 may be represented with a vector, the dot product of the vector of each track and the vector of the passback direction 6 may be computed, and each resulting dot product may be compared to a threshold. If the dot product is greater than the threshold, the corresponding track may be deemed to point in the passback direction; otherwise, the corresponding track may be deemed not to point in the passback direction. To eliminate false alarms, the tracks pointing in the passback direction may be filtered spatially and/or temporally. An exemplary embodiment of this filtering may allow detection only if there are a sufficient number of vectors in the passback direction over a spatial and/or temporal area. If a track is in the passback direction 6, flow proceeds to block 43 for that track. If no tracks are in the passback direction 6, flow proceeds to block 44. In an exemplary embodiment, the track may be compared to a range for the passback direction 6. The range may be a user-selected parameter specified during initialization in block 32.

In block 43, a track is determined to be in the passback direction 6, and a passback event is detected. Referring to FIG. 3, when a passback event is detected, one or more reports may be generated in block 34, and one or more triggered responses may occur in block 35.

In block 44, no track is determined to be in the passback direction 6, and no passback event is detected. Referring to FIG. 3, when no passback event is detected, one or more reports may be generated in block 34.

Figure 5:
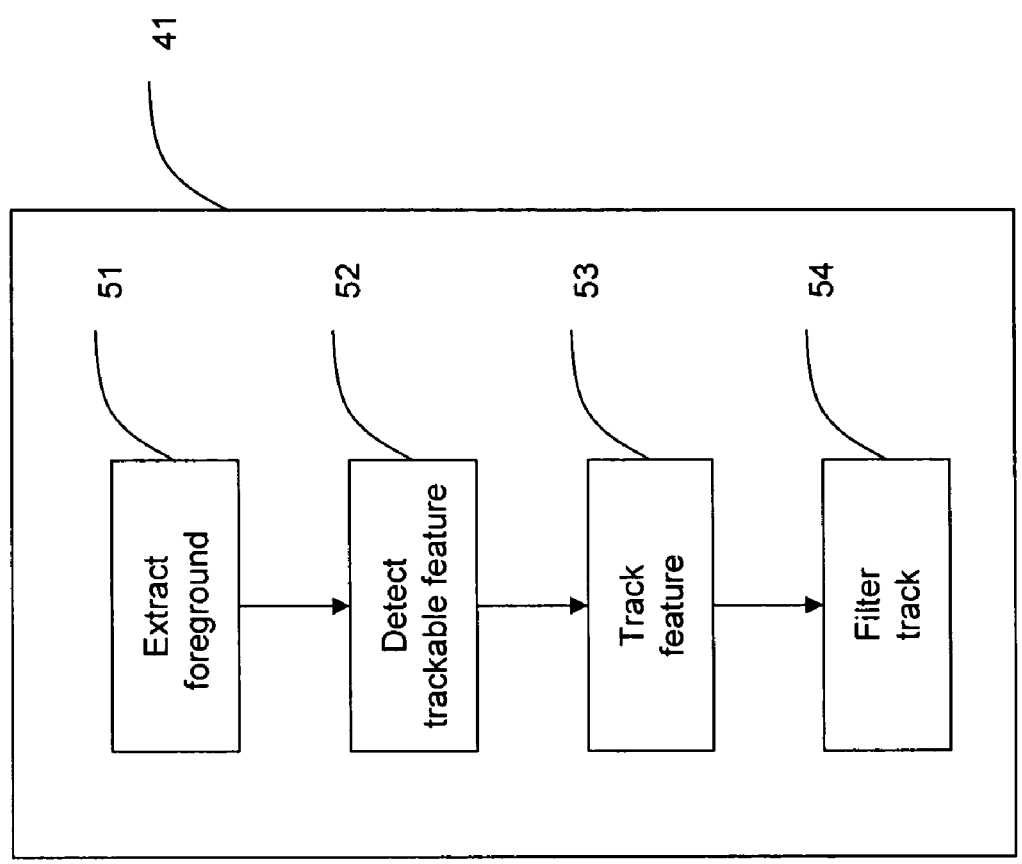
FIG. 5 illustrates a flowchart depicting an exemplary embodiment of extracting tracks for passback event detection.

FIG. 5 illustrates a flowchart depicting an exemplary embodiment of extracting tracks for passback event detection in block 41.

In block 51, the foreground may be extracted for a frame of the video (e.g., the moving pixels may be separated from the non-moving pixels). Techniques for foreground extraction (e.g., motion detection using, for example, three-frame differencing, or statistical background modeling) are well known in the art. In an exemplary embodiment (e.g., as discussed in U.S. Pat. No. 6,625,310, issued Sep. 23, 2003, titled "Video Segmentation Using Statistical Pixel Modeling," which is incorporated herein by reference), the foreground may be extracted using pixel statistics. The temporal statistics are stored for each pixel, and a pixel of the current frame may be categorized as foreground if its value is significantly different from the average of its past values. These foreground pixels may then be filtered to provide the foreground mask. With foreground extraction, the search space of subsequent steps may be limited, which may reduce false alarms as well. In an alternative exemplary embodiment, the foreground may be extracted using three-frame motion differencing, which is well known in the art. With three-frame motion differencing, two difference images may be generated between the current and a past frame and the current and a future frame, respectively. The two resulting difference images may then be compared, and a pixel may be designated as foreground if the pixel is detected in both difference images. These foreground pixels may then be filtered to provide the foreground mask.

In block 52, trackable features may be detected in the foreground image from block 51. Techniques for detecting trackable features in foreground image (e.g., corner detection or texture analysis) are well known in the art. An exemplary embodiment of block 52 is discussed below with respect to FIG. 6.

In block 53, the features may be tracked between frames of the video using the foreground image from block 51. Techniques for tracking features (e.g., correlation) are well known in the art. An exemplary embodiment of block 53 is discussed below with respect to FIG. 7.

In block 54, the resulting tracks may be filtered to reduce and/or eliminate false alarms. Techniques for filtering tracks (e.g., spatially and/or temporally) are well known in the art. Examples of filtering a track include: filtering noise from a track; filtering out nuisance tracks (e.g., tracks caused by the swinging arms of a person); filtering out tracks that are not sufficiently long lived; and filtering out tracks that are inconsistent with other nearby tracks.

Block 54 may be optional. Block 54 may be optional at the discretion of a user. Block 54 may also be optional due to the resulting track being sufficiently "clean" so as to not require any further filtering.

Figure 6:
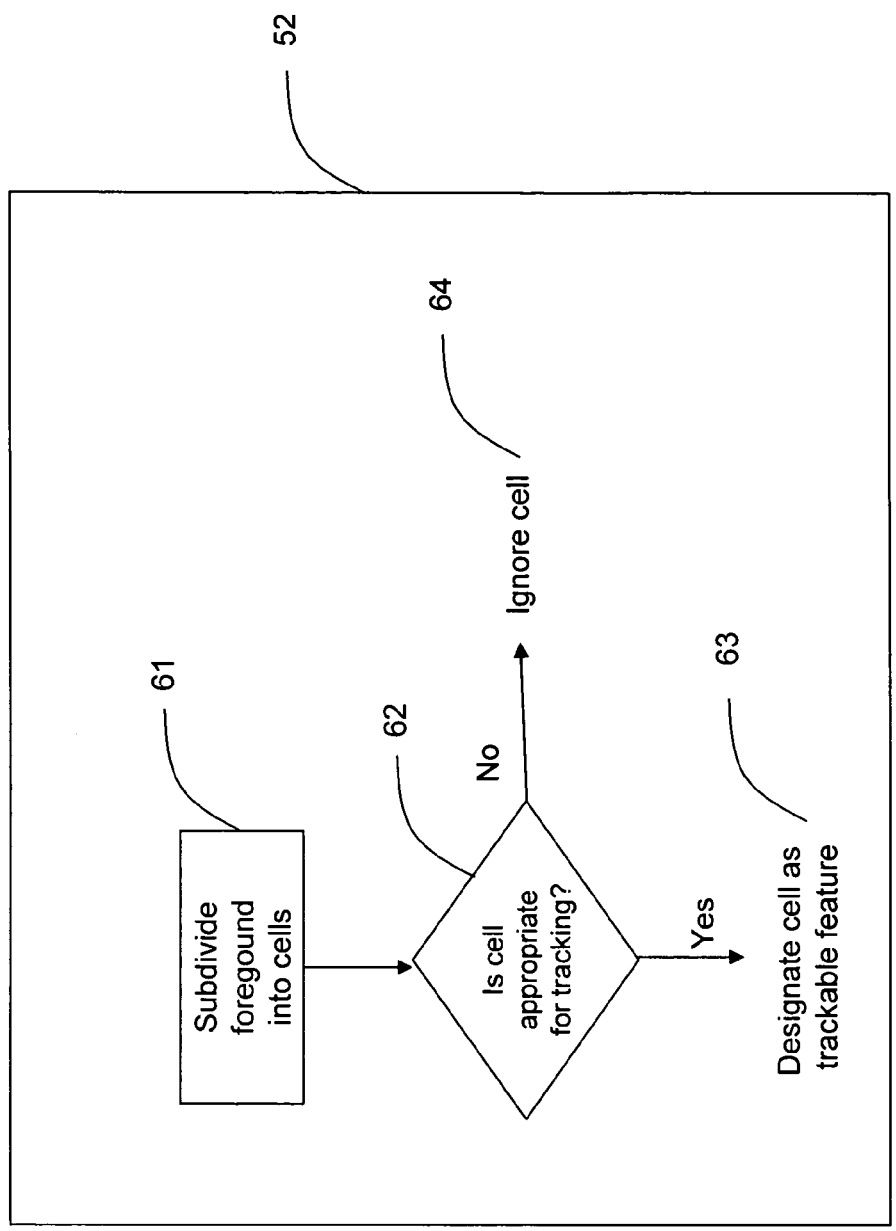
FIG. 6 illustrates a flowchart depicting an exemplary embodiment of detecting trackable features.

FIG. 6 illustrates a flowchart depicting an exemplary embodiment of detecting trackable features in block 52.

In block 61, the foreground area of the video may be subdivided into smaller, generally equal sized rectangular cells (or blocks).

In block 62, each cell may be evaluated to determine whether the cell is appropriate for tracking. In an exemplary embodiment, the trackability of a cell may be evaluated using, for example, metrics (e.g., texture, intensity range, number of different intensity values, presence of one or more edges, and/or presence of one or more corners in the cell).

In block 63, the cell may be determined to be appropriate for tracking, and the cell may be designated as a trackable feature.

In block 64, the cell may be determined not to be appropriate for tracking, and the cell may be ignored for further processing.

Figure 7:
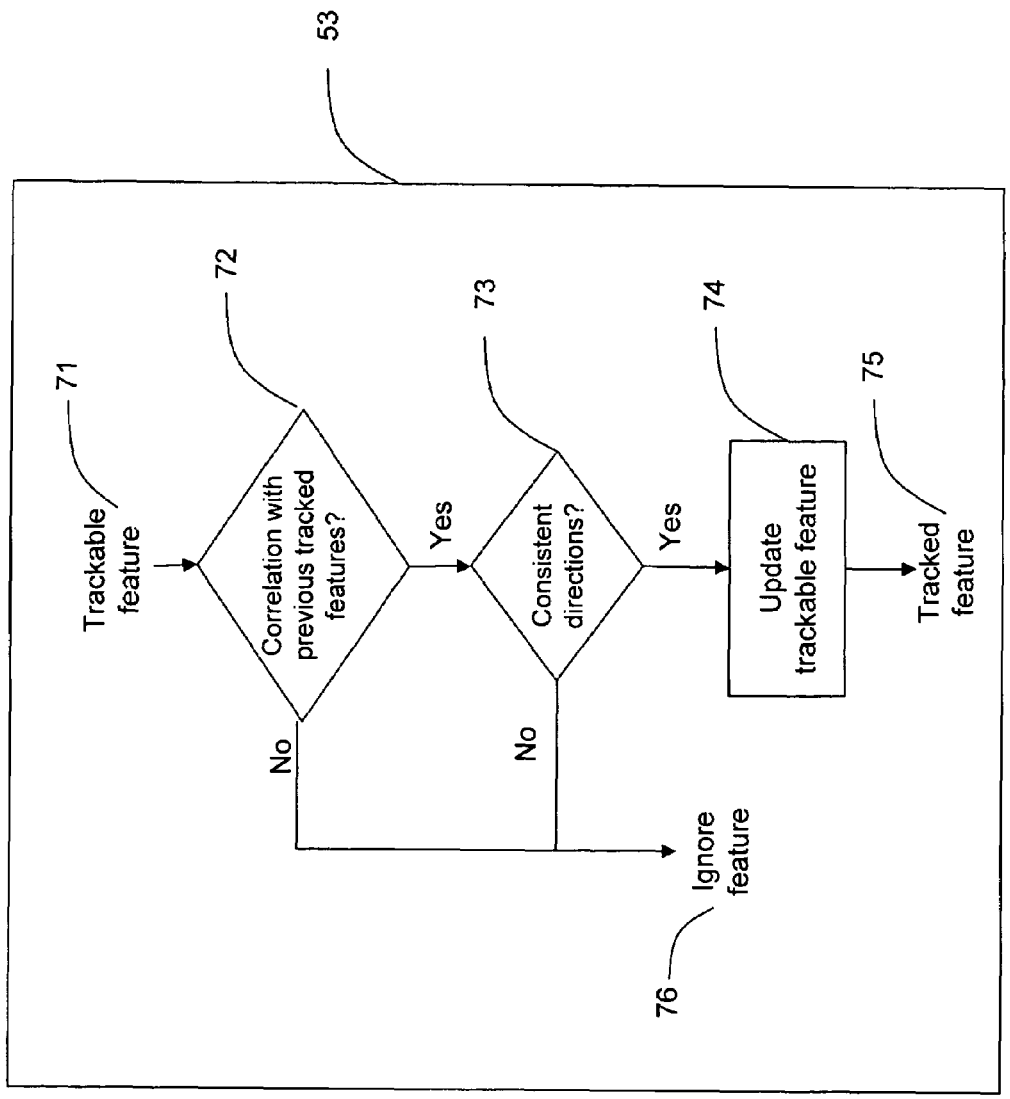
FIG. 7 illustrates a flowchart depicting an exemplary embodiment of tracking features.

FIG. 7 illustrates a flowchart depicting an exemplary embodiment of tracking features in block 53. The flowchart of FIG. 7 may be performed for each trackable feature 71 from block 52.

In block 72, the trackable feature 71 from block 52 of the currently processed frame may be correlated against the tracked features of one or more previous frames. If the correlation is high (e.g., there is an approximate match between the trackable feature 71 and a previous tracked feature), flow proceeds to block 73; otherwise, flow proceeds to block 76. In an exemplary embodiment, the past tracking may be used to predict an area where a corresponding trackable feature may be located, and the correlation may be performed in the predicted area (which may be known as a cell). In an exemplary embodiment, the entire cell may be used in a two-dimensional correlation. In an alternative exemplary embodiment, which may be faster, one-dimensional correlation may be performed on the horizontal and vertical projections of the cell.

In block 73, the directions of the correlated trackable feature and tracked feature may be compared. If the directions are consistent, flow proceeds to block 74; otherwise, flow proceeds to block 76.

In block 74, the current trackable feature 71 is updated with the information on the previous tracked feature. For example, the current trackable feature 71 is updated with the direction and age of the previous tracked feature.

In block 75, the trackable feature may be designated as a tracked feature.

In block 76, the trackable feature may be ignored and not used in further processing.

Figure 8:
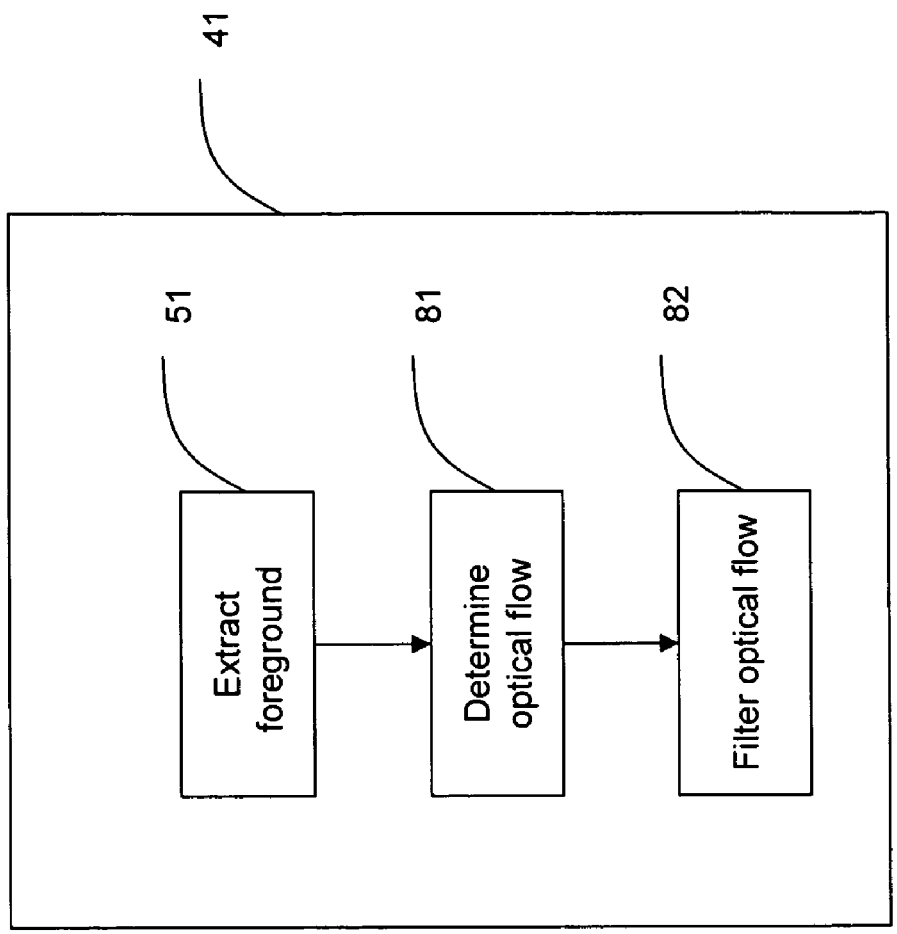
FIG. 8 illustrates a flowchart depicting another exemplary embodiment of extracting tracks for passback event detection.

FIG. 8 illustrates a flowchart depicting another exemplary embodiment of extracting tracks for passback event detection in block 41 of FIG. 4. FIG. 8 is similar to FIG. 5. In FIG. 8, blocks 52 and 53 of FIG. 5 are replaced by block 81, and block 54 from FIG. 5 is replaced by block 82.

In block 81, optical flow may be detected and, thereby, used to determine the track. Techniques for detecting optical flow (e.g., differential methods, frequency-based methods) are well known in the art. An exemplary embodiment of block 81 is discussed below with respect to FIG. 9.

In block 82, the resulting optical flow may be filtered. Block 82 is the same as block 54, except optical flow, instead of tracks, are filtered. Since the optical flow algorithm may provide denser tracks, more aggressive filtering may be required than with that required for block 54.

Figure 9:
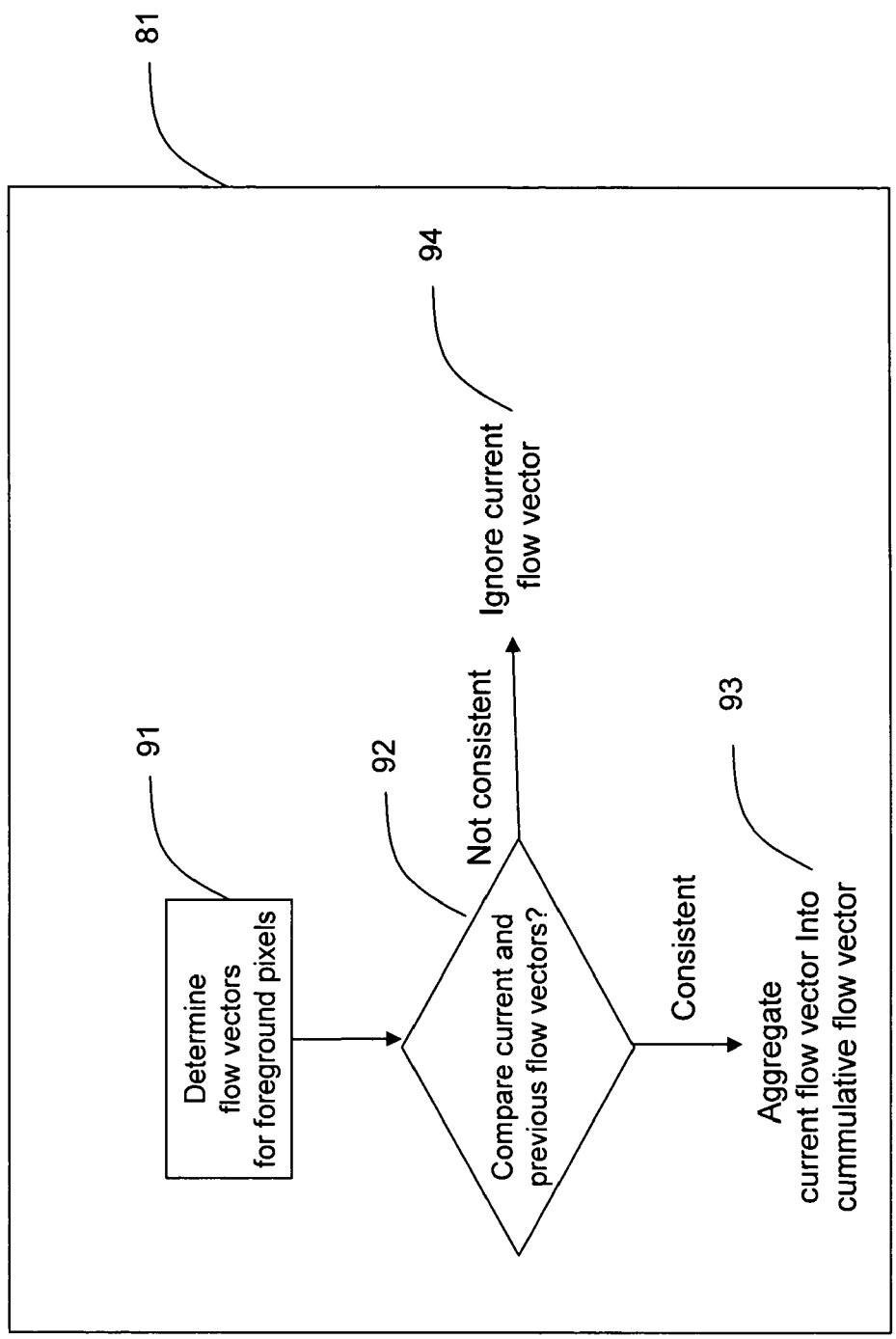
FIG. 9 illustrates a flowchart depicting an exemplary embodiment for detecting optical flow.

FIG. 9 illustrates an exemplary embodiment for detecting optical flow in block 81.

In block 91, the optical flow for the foreground pixels of the current frame may be initially determined, which may result in a flow vector for each foreground pixel being determined.

In block 92, each flow vector may then be compared with the flow vector computed for the previous frame and ending at that same pixel. If the flow vectors are consistent (e.g., having similar direction and/or speed), flow proceeds to block 93; otherwise, flow proceeds to block 94.

In block 93, because the current and previous flow vectors may be consistent, the current flow vector may be aggregated into a cumulative flow vector. The cumulative flow vectors may be treated as being equivalent to the tracked features, as determined in block 53.

In block 94, the current flow vector may be ignored and not used in further processing.

Figure 11:
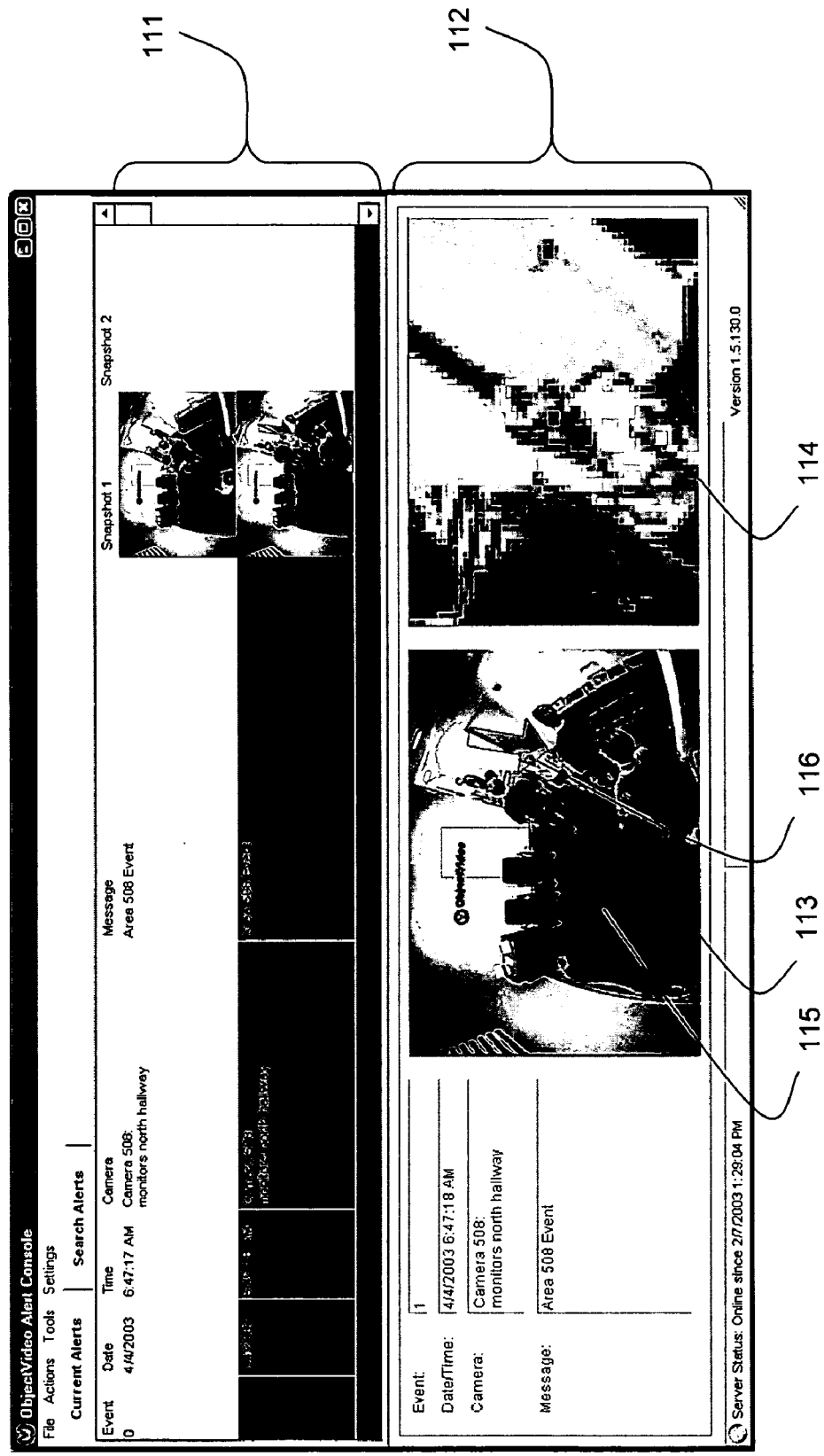
FIG. 11 illustrates an exemplary screen shot depicting an exemplary embodiment of reporting results from video passback event detection.

FIG. 11 illustrates an exemplary screen shot depicting an exemplary embodiment of reporting results from video based passback event detection. The exemplary screen shot may be produced as part of block 34. The top portion 111 of the screen shot may show the list of all detected passback events, with exact date, time, and location information (e.g., identification of video camera 1 and message). The bottom portion 112 of the screen shot may show the details of the highlighted (e.g., selected) detected passback event from the list in the top portion 111. The details of the selected event may include, for example, the same information as in the top portion 111 for the selected event, a snapshot 113 of the detected event, and a close up 114 of the snapshot of the detected event. The snapshot 113 may include a first arrow 115 indicating the passback direction and a second arrow 116 indicating the detected direction of the track of the target. The close up 114 of the snapshot may depict the region of the video monitored area where the passback event was detected and includes the face of the target. This exemplary display may be extended to allow the user to click on the bottom image or a button to view a corresponding video taken at approximately the time of the passback event.

In an exemplary embodiment, the invention may operate in real time. To operate in real time, all components should be able to support real time processing. For real time processing, the video signal should travel from the video camera 1 through the communication medium 2 and receiver 31 to the computer system 32 in real time with minimal latency (e.g., delay), and the techniques and hardware selected for collecting and analyzing data in block 33 should be selected appropriately. As the techniques illustrated in FIG. 5 may be computationally intensive, the techniques and hardware used should be selected appropriately to achieve real time detection of passback events.

The embodiments and examples discussed herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer-readable medium, comprising software encoded thereon to detect passback events, which software when executed by a computer system, causes the computer system to perform operations comprising a method of:

defining a passback direction for a video monitored area;
accessing video collected from the video monitored area;
comparing a track determined from the collected video to the passback direction to detect whether any passback event occurred, comprising:
  representing said track as a track vector;
  representing said passback direction as a passback direction vector;
  determining a dot product of said track vector and said passback direction vector;
  comparing said dot product to a threshold to determine whether said track vector is substantially aligned with said passback direction; and
  when said track vector is substantially aligned with said passback direction, filtering said track vector by at least one of spatial filtering or temporal filtering to determine whether a sufficient number of track vectors are substantially aligned with said passback direction;
detecting passback events based on the determination; and
initiating an action based on the detected passback events.

2. A method to detect passback events, comprising:
defining a passback direction for a video monitored area;
accessing video collected from the video monitored area;
comparing a track determined from the collected video to the passback direction to detect whether any passback event occurred, comprising:
  representing the track as a track vector,
  representing the passback direction as a passback direction vector,
  determining a dot product of the track vector and the passback direction vector,
  comparing the dot product to a threshold to determine whether the track vector is substantially aligned with the passback direction, and
  when the track vector is substantially aligned with the passback direction, filtering the track vector by at least one of spatial filtering or temporal filtering to determine whether a sufficient number of track vectors are substantially aligned with the passback direction;
detecting passback events based on the determination; and
initiating an action based on the detected passback events.

3. A system to detect passback events, comprising:
a video camera to monitor a video monitored area and obtain video of the video monitored area;
an analysis system coupled to the video camera, the analysis system comprising a computer system and a computer-readable medium, the computer-readable medium comprising software to control the computer system according to a method, the method comprising:
  determining a track in the obtained video,
  representing the track as a track vector,
  representing a passback direction as a passback direction vector,
  determining a dot product of the track vector and the passback direction vector,
  comparing the dot product to a threshold to determine whether the track vector is substantially aligned with the passback direction,
  when the track vector is substantially aligned with the passback direction, filtering the track vector by at least one of spatial filtering or temporal filtering to determine whether a substantial number of track vectors are substantially aligned with the passback direction, and
  detecting the passback events in the video monitored area based on the number of track vectors which are substantially aligned with the passback direction; and
a user interface coupled to the analysis system.

4. An apparatus to detect passback events adapted to perform operations comprising a method of:
defining a passback direction for a video monitored area;
accessing video collected from the video monitored area;
comparing a track determined from the collected video to the passback direction to detect whether any passback event occurred, comprising:
  representing the track as a track vector,
  representing the passback direction as a passback direction vector,
  determining a dot product of the track vector and the passback direction vector,
  comparing the dot product to a threshold to determine whether the track vector is substantially aligned with the passback direction, and
  when the track vector is substantially aligned with the passback direction,
filtering the track vector by at least one of spatial filtering or temporal filtering to determine whether a sufficient number of track vectors are substantially aligned with the passback direction;
detecting passback events based on the determination; and
initiating an action based on the detected passback events.

* * * * *

UNITED STATES PATENT AND TRADEMARK OFFICE
CERTIFICATE OF CORRECTION

PATENT NO. : 7,646,401 B2 Page 1 of 1
APPLICATION NO. : 10/766949
DATED : January 12, 2010
INVENTOR(S) : Lipton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1748 days.

Signed and Sealed this

Sixteenth Day of November, 2010

David J. Kappos
*Director of the United States Patent and Trademark Office*